(12) United States Patent
Schmidt et al.

(10) Patent No.: US 8,246,076 B2
(45) Date of Patent: Aug. 21, 2012

(54) AIRBAG FOR A VEHICLE OCCUPANT RESTRAINT SYSTEM AND A METHOD FOR PROTECTING A VEHICLE OCCUPANT

(75) Inventors: Torsten Schmidt, Berlin (DE); Jens Feller, Illerkirchberg (DE); Tomas Radocak, Ulm (DE); Rainer Heuschmid, Ulm (DE); Robert Getz, Ulm (DE); Thomas Sievers, Ulm (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 12/654,383

(22) Filed: Dec. 17, 2009

(65) Prior Publication Data

US 2010/0171292 A1 Jul. 8, 2010

(30) Foreign Application Priority Data

Dec. 18, 2008 (DE) .................. 20 2008 016 777
Jan. 28, 2009 (DE) .................. 10 2009 007 179

(51) Int. Cl.
*B60R 21/207* (2006.01)
(52) U.S. Cl. ............... 280/730.2; 280/730.1; 280/743.1
(58) Field of Classification Search ............... 280/728.2, 280/729, 730.2, 743.1, 730.1
See application file for complete search history.

(56) References Cited

U.S. PATENT DOCUMENTS

| 5,722,685 | A | 3/1998 | Eyrainer | |
|---|---|---|---|---|
| 5,924,721 | A | 7/1999 | Nakamura et al. | |
| 7,278,656 | B1 | 10/2007 | Kalandek | |
| 7,314,230 | B2 | 1/2008 | Kumagai et al. | |
| 7,766,379 | B2 * | 8/2010 | Dix et al. | 280/730.2 |
| 7,819,423 | B2 * | 10/2010 | Loibl et al. | 280/730.2 |
| 7,891,704 | B2 * | 2/2011 | Taguchi et al. | 280/739 |
| 2003/0168836 | A1 * | 9/2003 | Sato et al. | 280/730.2 |
| 2004/0007905 | A1 | 1/2004 | Acker et al. | |
| 2005/0173900 | A1 * | 8/2005 | Zhao et al. | 280/730.2 |
| 2005/0184493 | A1 * | 8/2005 | Hofmann et al. | 280/730.2 |

(Continued)

FOREIGN PATENT DOCUMENTS

DE 197 14 266 A1 11/1997

(Continued)

OTHER PUBLICATIONS

DE Office Action in DE Appln No: 10 2009 007 179.2 dated Jul. 20, 2010.

*Primary Examiner* — Joseph Rocca
*Assistant Examiner* — James English
(74) *Attorney, Agent, or Firm* — Foley & Lardner LLP (57) ABSTRACT

An airbag arrangement for a vehicle occupant restraining system including at least one inflatable airbag and an inflating device. The airbag includes a first inflatable area which extends in the inflated status of the airbag in the area of a first body region of the vehicle occupant, and a second inflatable area, which extends in the inflated status of the airbag in the area of a second body region of the vehicle occupant. The first inflatable area has a larger thickness vertical to the main extension plane of the airbag than the second inflatable area. The inflating device and the airbag are designed for inflating the first inflatable area of the airbag to such a high internal pressure that during the impact of the occupant on the airbag a force is exerted onto the first body region of the vehicle occupant which sets the occupant into a tilting motion.

17 Claims, 6 Drawing Sheets

U.S. PATENT DOCUMENTS

| | | | |
|---|---|---|---|
| 2005/0236819 A1* | 10/2005 | Riedel et al. | 280/730.2 |
| 2006/0022441 A1* | 2/2006 | Hayashi et al. | 280/730.2 |
| 2006/0043702 A1* | 3/2006 | Jamison | 280/729 |
| 2006/0220359 A1 | 10/2006 | Sato | |
| 2007/0057492 A1* | 3/2007 | Feller et al. | 280/730.2 |
| 2007/0164546 A1 | 7/2007 | Kai et al. | |
| 2009/0140509 A1 | 6/2009 | Johansson et al. | |

FOREIGN PATENT DOCUMENTS

| | | |
|---|---|---|
| DE | 197 14 266 A1 | 11/1997 |
| DE | 102 46 769 A1 | 4/2004 |
| DE | 102 31 631 A1 | 7/2004 |
| DE | 103 23 129 A1 | 12/2004 |
| DE | 10 2004 009 013 A1 | 9/2005 |
| DE | 20 2006 002 605 U1 | 6/2006 |
| DE | 10 2005 047 606 A1 | 4/2007 |
| EP | 0 771 698 A2 | 5/1997 |
| EP | 1 344 694 A2 | 9/2003 |
| EP | 1 380 475 A1 | 1/2004 |
| EP | 1 433 667 A2 | 6/2004 |
| EP | 1 567 394 B1 | 8/2005 |
| EP | 1 586 489 A1 | 10/2005 |
| WO | WO 2004/050434 A1 | 6/2004 |

* cited by examiner

AIRBAG FOR A VEHICLE OCCUPANT RESTRAINT SYSTEM AND A METHOD FOR PROTECTING A VEHICLE OCCUPANT

BACKGROUND

The present application relates to an airbag arrangement for a vehicle occupant restraining system and a method for protecting a vehicle occupant.

Such an airbag is for instance known from DE 10 2004 009 013 A1 (incorporated by reference herein).

SUMMARY

The problem to be solved by at least one disclosed embodiment is to provide an airbag arrangement which keeps the stress of the vehicle occupant to be protected as low as possible.

According to an exemplary disclosed embodiment, an airbag arrangement for a vehicle occupant restraining system is provided with
  at least one inflatable airbag for the protection of the vehicle occupant; and
  an inflating device for inflating the airbag, whereby the airbag is provided with:
  a first inflatable area which extends in the inflated status of the airbag in the area of a first body region of the vehicle occupant, and
  a second inflatable area which extends in the inflated status of the airbag in the area of a second body region of the vehicle occupant which is being less resilient than the first body region, whereby
  the first inflatable area has in the inflated status of the airbag a larger thickness vertical to the main extension plane of the airbag than the second inflatable area, and whereby
  the inflating device and the airbag are designed for inflating the first inflatable area of the airbag to such a high internal pressure so that during the impact of the vehicle occupant on the airbag a force is exerted onto the first body region of the vehicle occupant which sets the vehicle occupant into a tilting motion.

The airbag arrangement according to the exemplary embodiment is in particular about a side airbag arrangement which is to be arranged for instance in or on a vehicle seat or a vehicle door. The airbag arrangement is for instance to be arranged in a vehicle such that the main extension plane, e.g. the plane along which the inflatable airbag mainly extends, is spanned by the vehicle longitudinal and the vehicle height direction.

Since the first inflatable area has vertical to the main extension plane of the airbag, e.g. in case of an airbag assembled in the vehicle for instance in vehicle cross direction, a larger thickness (extension) than the first inflatable area which is arranged to a less resilient body region of the vehicle occupant to be protected, the first area of the airbag docks in the event of a crash onto the vehicle occupant.

A docking of the second inflatable area onto the second body region of the vehicle occupant occurs therefore—if at all—to a later time point at a later time after contact of the first area to the body region of the vehicle occupant arranged to the first area. Hereby, the movement of the vehicle occupant can be decelerated (in particular due to dissipation of movement energy) for instance before the impact of the sensitive second body region of the vehicle occupant onto the airbag.

Since the first inflatable area of the airbag is inflated in case of a crash to a high internal pressure in particular in comparison to the common side airbags, a "penetrating" of the vehicle occupant through the first inflatable area is avoided so that the more sensitive body region of the vehicle occupant strikes only with the desired timely delay or not at all on to the airbag. A force is exerted in particular at first only to the body region of the vehicle occupant striking the first area. This means that at first only the movement of the body region arranged to the first area of the airbag is delayed during impact onto the airbag while other body regions of the vehicle occupant move due to their inertia further into the direction of the airbag so that the tilting motion of the vehicle occupant is generated.

The generated tilting motion of the vehicle occupant leads in particular to the case that the vehicle occupant strikes the airbag virtually bevelled whereby in particular in a first striking phase at first only an upper body region (for instance upper thorax area, shoulder area) and a lower body region (for instance pelvis) of the vehicle occupant comes in contact with the airbag and a middle region located between (in particular the thorax area or a lower thorax area) docks only with the delay or not at all to the airbag.

The first body region of the vehicle occupant is moved away in particular by a stimulating effect of the first inflatable area of the airbag from a collision side of the vehicle, for instance into the vehicle interior, or at least a movement of the first body region to the vehicle structure effected by the collision is decelerated.

It is being pointed out that the formulation whereby the "first area" has a larger thickness than "the second area" is not necessarily to be understood that the first and/or the second area have to have a constant thickness, e.g. a constant extension vertical to the main extension plane of the airbag. The "thickness" of the first and/or the second area relates in particular to an average thickness of the respective area.

In an exemplary embodiment, the airbag arrangement is concerned with the side airbag arrangement which is to be arranged in the vehicle such that the first inflatable area of the airbag has in the inflated status of the airbag in vehicle cross direction a larger thickness than the second inflatable area so that the vehicle occupant during striking the airbag is set into a tilting motion around an axis continuing essentially parallel to the vehicle longitudinal direction.

In a further exemplary variant, the inflating device and the airbag are designed for inflating the first area of the airbag to an internal pressure of at least ca. 1.5 bar. The first area of the airbag is inflated for instance to an internal pressure between 1.5 and 2.5 bar, in particular ca. 1.8 bar. This pressure is for instance considerably higher than the internal pressure usually applied in a side airbag.

The mentioned high internal pressure is generated in particular only in the first area of the airbag, which is arranged to a specifically resilient body region of the vehicle occupant, in order to avoid the impact of the second, less resilient body region onto the airbag or at least to temporarily delay it. The second area of the airbag has for instance in the inflated status a lower internal pressure than the first area of the airbag. It is however also possible that the first and the second area have similar internal pressures in the inflated status.

The first and the second inflatable area of the airbag can be for instance formed as sections of a common inflatable chamber of the airbag whereby the inflatable chamber is in particular defined by an (one or multiple layers) airbag material. In a further variant the first and the second area of the airbag are formed in each case by inflatable chambers being at least sectionally separated from each other. In this variant the chambers can be in fluid communication with each other or can also be completely separated from each other.

In another exemplary embodiment, the airbag comprises a third inflatable area for protection of a third (being different from the first and the second body region of the vehicle occupant) body region of the vehicle occupant. The airbag is for instance designed such that the vehicle occupant while striking the airbag is set in such a tilting motion that the third body region strikes the third area of the airbag before the second, less resilient body region strikes the second area of the airbag.

The second area of the airbag is for instance—in respect to the assembled and inflated status of the airbag—arranged along the vehicle height direction between the first and the third area.

In an exemplary embodiment the third inflatable area of the airbag is provided with damping means (for instance in form of one or multiple outflow openings through which gas can disappear during the impact of the vehicle occupant) so that kinetic energy of the vehicle occupant and/or of a vehicle structure moving towards the airbag following the collision is dissipated.

Furthermore, the third area of the airbag can have crosswise to the main extension direction of the inflated airbag (e.g. in respect to the in the vehicle assembled and inflated status of the airbag along the vehicle cross direction) a larger thickness (extension) as the second area of the airbag. The third area has for instance a similar thickness than the first area of the airbag. The third area is in particular designed such that it is inflated with an internal pressure comparable to the first inflatable area or is inflated with a lower internal pressure.

The third area serves in particular the protection of an upper thorax region, a shoulder and/or head region of the vehicle occupant. It can be provided simultaneously that the first inflatable area of the airbag is designed for the protection of the pelvis region and the second inflatable area of the airbag is designed for the protection of the thorax region (in particular a lower thorax region) of the vehicle occupant.

In this example the vehicle occupant will strike the first area of the airbag after a collision of the vehicle at first with the pelvis region whereby the pelvis area is decelerated in its movement to the collision side or is moved into the vehicle interior. Hereby the impact of the thorax region of the vehicle occupant onto the second area of the airbag is delayed or even avoided. Furthermore, due to the striking of the vehicle occupant in its pelvis area a tilting motion of the vehicle occupant is initiated so that the upper body area (in particular the shoulder and head region) of the vehicle occupant is moved towards the airbag and couples to the third inflatable area of the airbag with a timely delay.

Furthermore, the third area of the airbag provided for the protection of the shoulder region of the vehicle occupant can have damping means for damping the impact, for instance in the form of an outflow opening, so that due to the impact of the shoulder region of the vehicle occupant onto the third area of the airbag the kinetic energy of the vehicle occupant can be absorbed or dissipated. Due to the impact of the shoulder region onto the airbag so much energy can in particular be absorbed or dissipated so that in case of a possible following impact of the thorax region of the vehicle occupant onto the airbag said region is only affected to a small extent.

In order to produce the lower thickness of the second inflatable area of the airbag means are in particular provided via which the at least two sections of an inner surface of an airbag material facing the interior of the second inflatable area, which defines the second inflatable area, are connected with each other. The second inflatable area is for instance formed by two airbag layers connected to each other along a rim seam whereby the means for reduction of thickness comprise at least one dart via which the two airbag layers are additionally connected to each other. In a further variant the means for reduction of thickness comprises an adhesion and/or a retaining strip arranged in the interior of the second inflatable area.

The airbag is for instance provided with a bevel on its side pointing in the inflated status in forward travelling direction in order to adapt in the inflated status to an arm outline and/or lateral shoulder outline of the vehicle occupant.

In a further exemplary embodiment, the airbag arrangement is assembled to a vehicle seat whereby the airbag is designed such that it is in the inflated status along a back rest of the vehicle seat shorter than the back rest. The airbag is in particular designed such that it ends in the inflated status beneath a beginning of an arm of the vehicle occupant sitting on the vehicle seat.

The present application also discloses a method for protecting a vehicle occupant with the steps arranging an airbag arrangement with at least one inflatable airbag for protecting the vehicle occupant which is provided with a first inflatable area for protecting a first body region of the vehicle occupant and a second inflatable area for protecting a second body region of the vehicle occupant which is less resilient than the first body region, whereby the airbag is designed and the airbag arrangement is arranged in the vehicle such that the first inflatable area has an inflated status of the airbag in vehicle cross direction, a larger thickness than the second inflatable area; and inflating the first inflatable area in case of a collision of the vehicle to such a high internal pressure that during impact of the vehicle occupant on the airbag a force is exerted to the first body region of the vehicle occupant which sets the vehicle occupant into a tilting motion.

BRIEF DESCRIPTION OF THE DRAWINGS

The invention is explained in the following by the means of examples referring to the Figures.

DETAILED DESCRIPTION

Figure 1A:
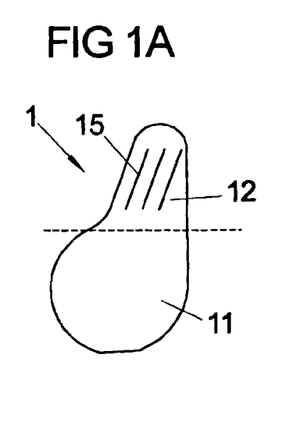
FIG. 1A shows an airbag of an airbag arrangement according to a first embodiment.
Figure 1B:
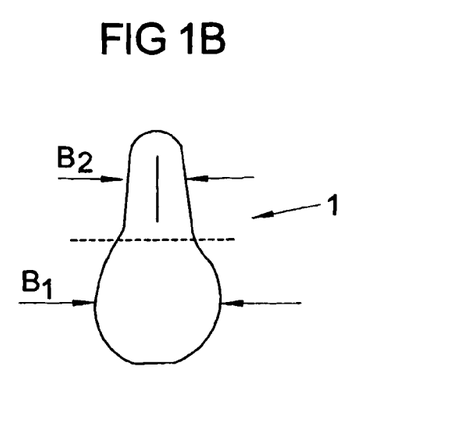
FIG. 1B shows the airbag according to FIG. 1A from the vehicle front.

FIGS. 1A and 1B relate to an airbag according to a first embodiment of the airbag arrangement, whereby FIG. 1A shows the schematically shown airbag 1 in a side view (in relation to its assembled position in the vehicle from a vehicle long side) and FIG. 1B shows the airbag from the front, that means from the vehicle front.

Airbag 1 has a first inflatable area 11 for protecting a first body region of the vehicle occupant (not shown) as well as a second inflatable area 12 for protecting a second body region of the vehicle occupant, which is less resilient than the first body region. The second inflatable area 12 extends in the assembled and inflated airbag above (in respect to the vehicle height direction) and adjacent to the first inflatable area 11.

The upper, second inflatable area 12 of the airbag 1 continues in the inflated status of the airbag in particular in the area of a thorax region of the vehicle occupant. The lower, first inflatable area 11 continues on the other hand for instance in the area of the pelvis of the vehicle occupant. The second inflatable area 12 has, if looked at along the vehicle cross direction, a lower thickness $B_2$ than the first inflatable area 11 (thickness $B_1$).

The first area 11 is inflated by an inflating device (not shown) of the airbag arrangement with such a high internal pressure that the pelvis region of the vehicle occupant impacting the first area 11 or being stroked such that it changes its position compared to the upper body region (thorax region), whereby a tilting motion of the vehicle occupant is generated.

For reduction of thickness of the second area 12 a multitude of linear darts 15 is provided which connects opposite sections of an airbag material forming the airbag with each other.

Figure 2A:
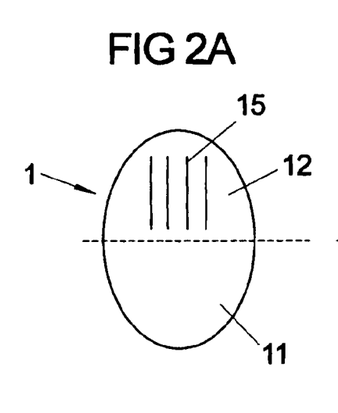
FIG. 2A shows an airbag according to a second embodiment of the airbag arrangement.
Figure 2B:
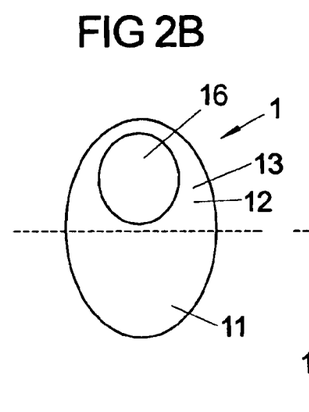
FIG. 2B shows an airbag according to a third embodiment of the airbag arrangement.
Figure 2C:
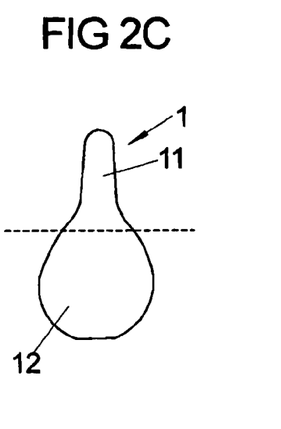
FIG. 2C shows a front view of the airbags shown in the FIGS. 2A and 2B.

FIGS. 2A to 2C relate to a second and third embodiment of an airbag of the airbag arrangement. FIG. 2C shows a front view of the airbags 1 shown in the FIGS. 2A and 2B in a side view.

The airbag of FIG. 2A resembles the airbag of FIG. 1A since it also has a first and a second chamber 11, 12 whereby the second chamber 12 is arranged above the first chamber and has a thickness reduced by darts 15 compared to the lower chamber 11. In difference to FIG. 1A the airbag of FIG. 2A has an almost symmetrical outline in its side view, that means a maximum extension—if looked at in forward travelling direction—of the upper chamber corresponds in particular to the one of the lower chamber. The upper area 12 has therefore approximately the same volume as the lower area 11 of the airbag.

The outline of the airbag 1 according to FIG. 2B corresponds in a side view to the one of the airbag of FIG. 2A. However, the upper, second area 12 of the airbag has no darts for reducing thickness but a through opening 16 which is surrounded by a circular airbag section 13. The circular section 13 can have a thickness reduced compared to the lower, first area 11 of the airbag (as shown in FIG. 2C). The section 13 can however also have a similar thickness as the area 11 so that the thickness reduction in the upper area of the airbag 12 is only realized by the through opening 16. Instead of the through opening 16 a fabric layer can for instance be arranged.

Figure 3A:
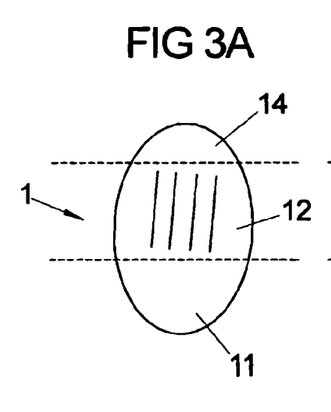
FIG. 3A shows an airbag according to a fourth embodiment of the airbag arrangement.
Figure 3B:
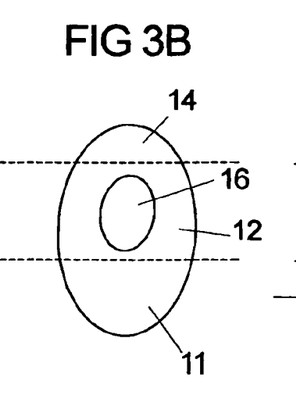
FIG. 3B shows an airbag according to a fifth embodiment of the airbag arrangement.
Figure 3C:
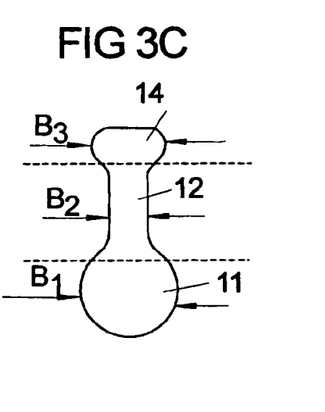
FIG. 3C shows a side view of the airbags shown in the FIGS. 3A and 3B.

The variants of the FIGS. 3A and 3B (FIG. 3C shows a side view of these Figures) resemble the variants of the FIGS. 2A, 2B with the difference that in addition to the first and the second area 11, 12 a third area 14 of the airbag is provided, which extends above and subsequently on the second area 12 of the airbag (in respect to the inflated status of the airbag). The third area 14 extends in particular in the area of an upper thorax and/or a shoulder region of a vehicle occupant.

According to FIG. 3C the third area 14 has a thickness $B_3$ vertical to the main extension direction of the airbag 1 which is larger than the thickness $B_2$ of the second area 12 and corresponds approximately to the width $B_1$ of the first inflatable area 11.

The third inflatable area 14 can extend upwards so far that it protects beside the shoulder region also a head area of the vehicle occupant. In a further variant the airbag has an additional area (not shown) above the third area for protecting the head.

It is pointed out that the invention is of course not restricted to the case that only one area of the airbag has a lower thickness. For instance also multiple areas of the airbag can be provided with means for reduction of the width, that means multiple thinner areas are formed whereby the thinner areas can also be produced in different manners, for instance one area has a dart and another area has a through opening.

Figure 4A:
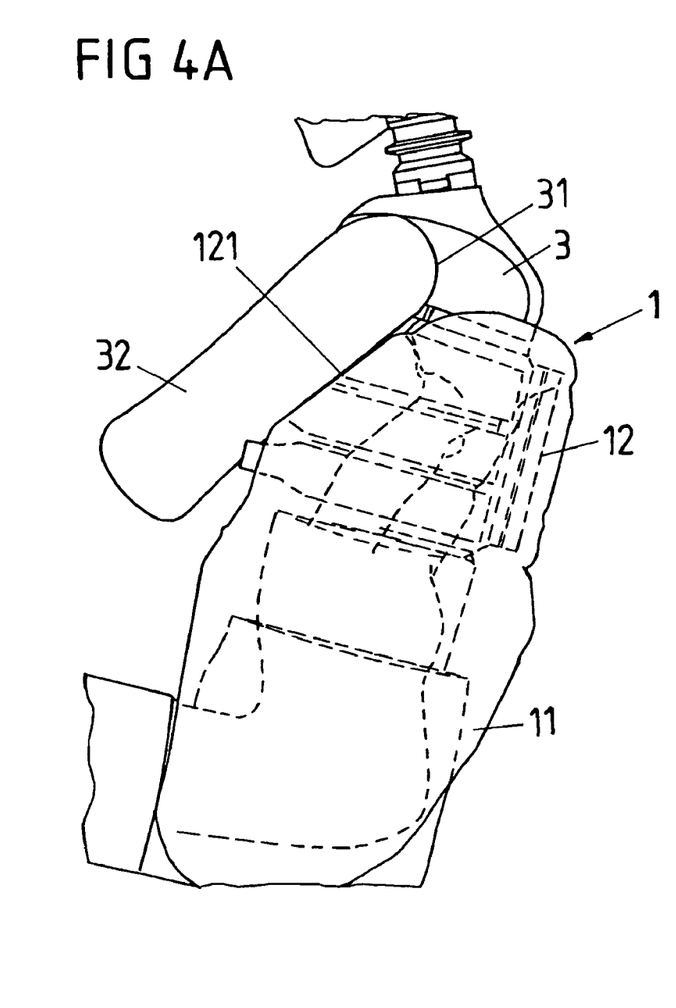
FIG. 4A shows an airbag according to the sixth embodiment of the airbag arrangement.
Figure 4B:
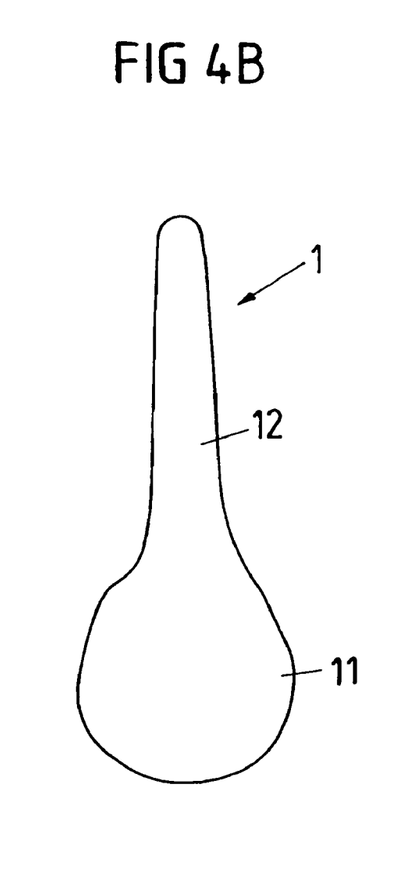
FIG. 4C schematically shows the airbag of FIG. 4A as compared with a seat back of the vehicle seat.

FIGS. 4A and 4B relate to a further embodiment of an airbag of the airbag arrangement. The airbag 1 is arranged on a vehicle seat (not shown) on which the vehicle occupant 3 is located and has (as recognizable in the front view according to FIG. 4B) similar to the airbag of the FIGS. 1A and 1B a first (lower) inflatable area 11 above which a second inflatable area 12 is attached.

The lower area 11 extends on the level of a pelvis of the vehicle occupant 3 while the upper area 12 of the airbag 1 extends on the level of a thorax area of the vehicle occupant. The height of the airbag 1 along the not shown back rest of the vehicle seat is dimensioned such that the upper area 12 ends approximately beneath a beginning of an arm 31 of the vehicle occupant. Furthermore, the airbag has in the upper area 12 a bevel 121 so that the airbag—if looked at from the side—has an outline which shall extend in the upper area 12 along an arm 32 of the vehicle occupant. The bevel 121 reduces therefore the extension of the airbag 1 in vehicle travelling direction to the beginning of the arm 31.

The lower area 11 of the airbag 1 is filled in case of a crash with such an internal pressure that the pelvis region of the vehicle occupant 3 is moved in contrast to the thorax and shoulder region of the vehicle occupant so that a tilting motion is generated, which leads to the fact that the vehicle occupant after striking the lower area 11 of the airbag with its pelvis region subsequently strikes an upper section of a second area 12 with a section of the upper thorax region or the lower shoulder region. In other words, the vehicle occupant strikes the airbag angular by a tilting motion so that at least the lower and middle section of the thorax region of the vehicle occupant comes in contact with the airbag 1 at last or not at all.

Figure 4C:
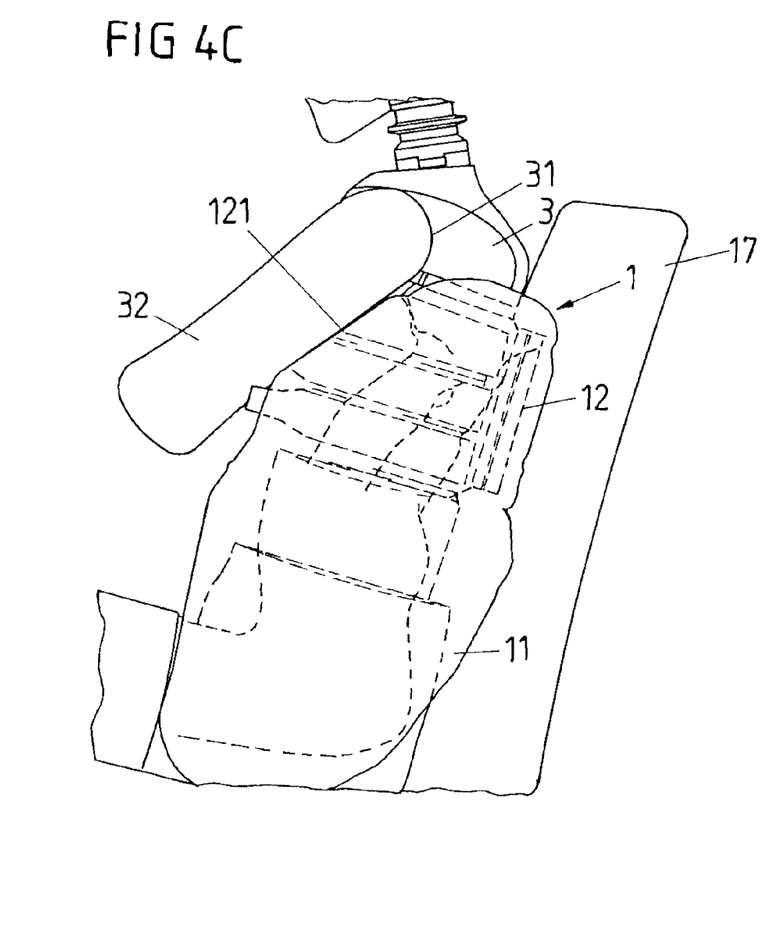

FIG. 4C shows the airbag of FIG. 4A in which the airbag arrangement is assembled to a vehicle seat whereby the airbag is designed such that it is, in the inflated status along a back rest 17 of the vehicle seat, shorter than the back rest 17. The airbag is in particular designed such that it ends in the inflated status beneath a beginning of an arm 31 of the vehicle occupant 3 sitting on the vehicle seat.

Figure 5A:
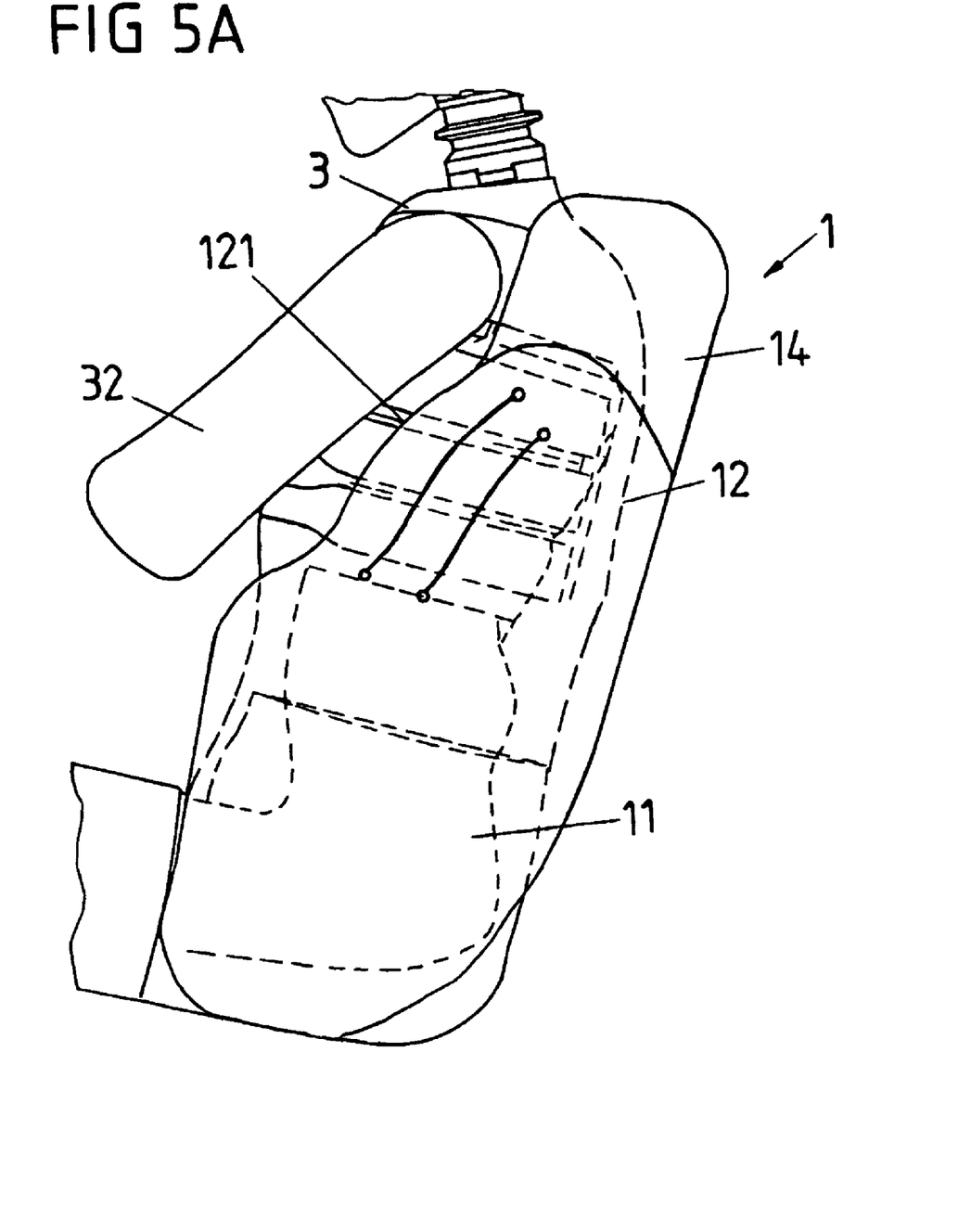
FIG. 5A shows an airbag according to a seventh embodiment of the arrangement.
Figure 5B:
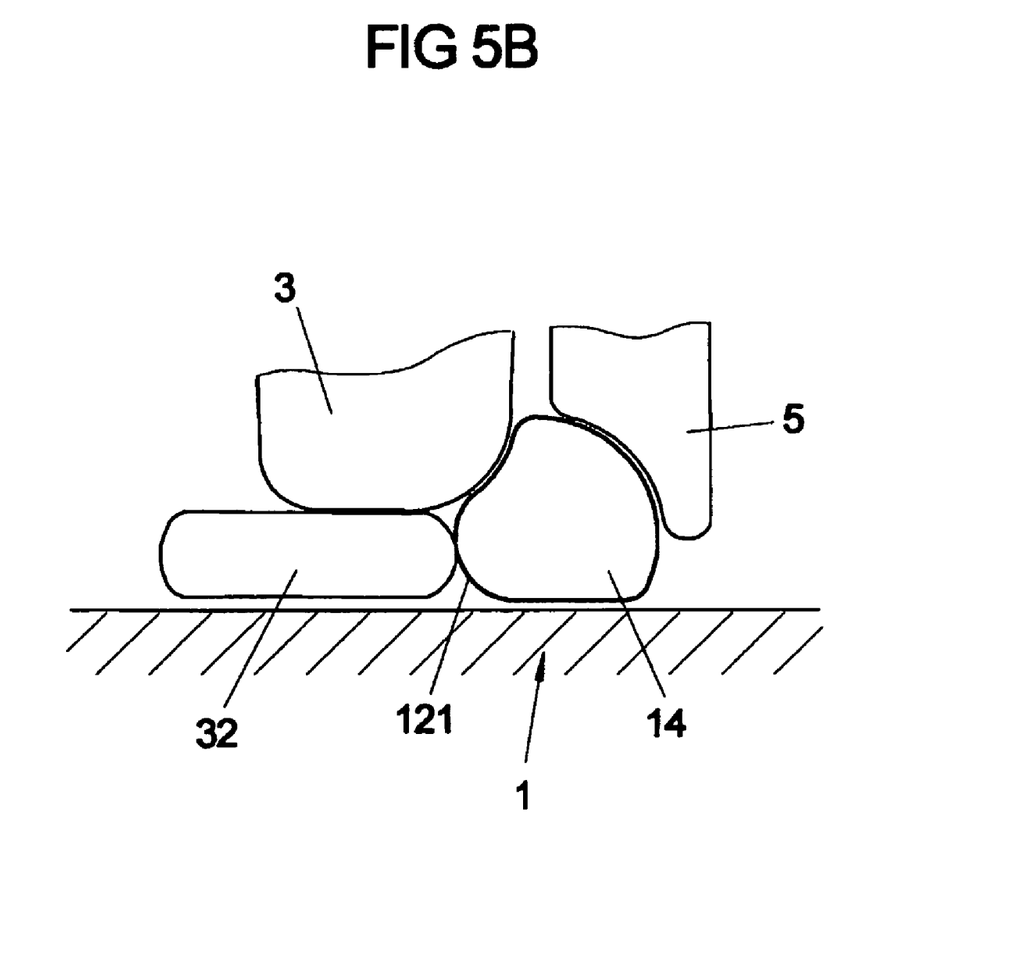
FIG. 5C schematically shows a front view of the airbag shown in the FIGS. 5A and 5B.

FIGS. 5A and 5B relate to a modification of the embodiment of FIGS. 4A and 4B. A singular airbag 1 has beside the first and second area 11, 12 a third area 14 which extends on the level of the shoulder region of the vehicle of the vehicle occupant 3. Due to the tilting motion of the vehicle occupant induced by the impact of the vehicle occupant 3 onto the airbag 1 the shoulder region strikes the airbag in the area of the third area 14 after the pelvis region of the vehicle occupant. A thinner second area 12 of the airbag comes therefore in contact with the thorax region of the vehicle occupant 3 only late or not at all.

The airbag 1 has again a bevel 121 so that its lateral outline is adapted to the arm 32 of the vehicle occupant 3. The airbag has, in particular in the vehicle longitudinal direction, in the first area 11 a first extension, in the second area a second extension and in the third area 14 a third extension, whereby the extension decreases from the lower first area 11 to the upper third area 14 so that the bevelled front side 121 is generated. The vehicle occupant 3 strikes thereby the airbag such that the arm 32 does not couple at all or only with a section to the airbag 1, whereby the strain, in particular of the thorax region of the vehicle occupant, is further reduced.

As shown in FIG. 5B the upper inflatable area 14 can in particular be designed such that it wraps with a section around the shoulder of the vehicle occupant 3, if he strikes the airbag 1. Therefore, the upper section 14 extends in part between a back rest 5 of the vehicle seat and the shoulder region of the vehicle occupant.

Figure 5C:
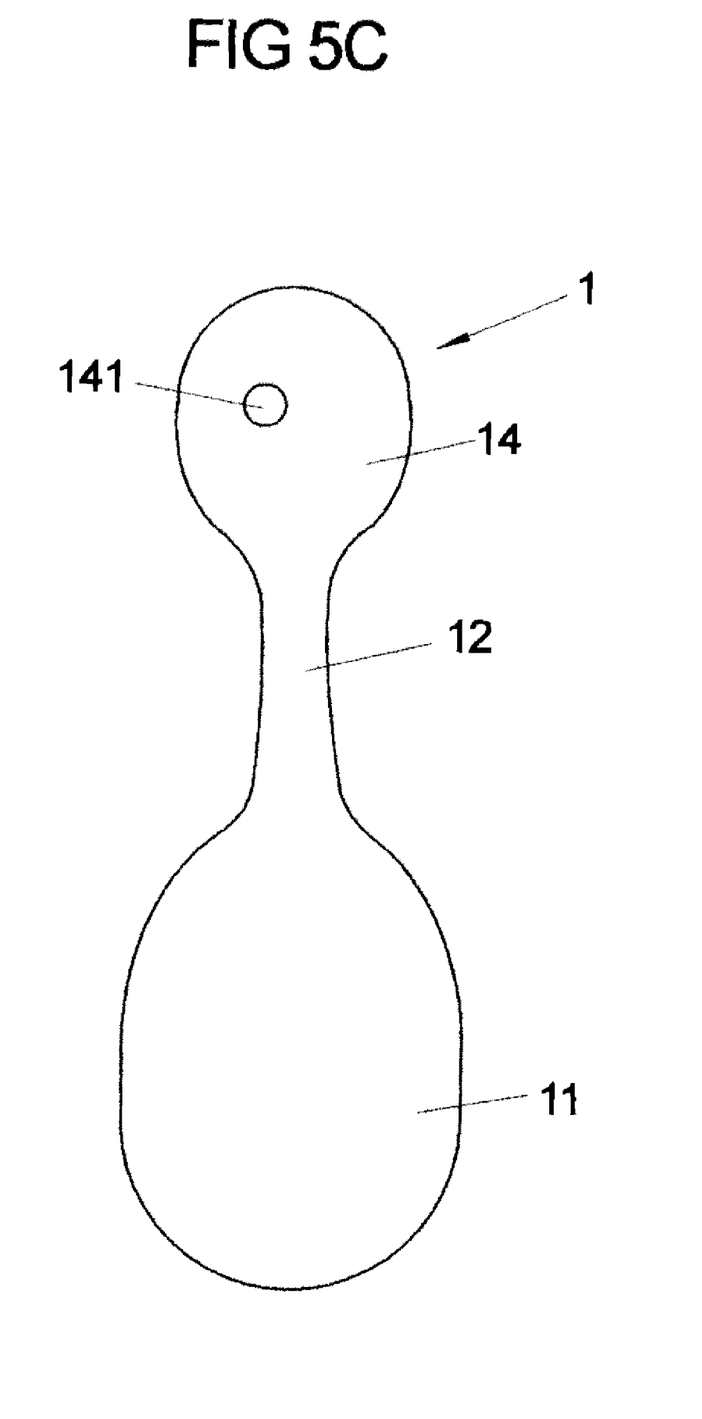

FIG. 5C shows a front view of the airbag shown in FIGS. 5A and 5B. The third area 14 of the airbag 1 can have crosswise to the main extension direction of the inflated airbag (e.g. in respect to the in the vehicle assembled and inflated status of the airbag along the vehicle cross direction) a larger thickness (extension) as the second area 12 of the airbag 1. The third area 14 has for instance a similar thickness than the first area 11 of the airbag. The third area 14 is in particular designed such that it is inflated with an internal pressure comparable to the first inflatable area 11 or is inflated with a lower internal pressure. Furthermore, the third area 14 provided for the protection of the shoulder region of the vehicle occupant can have damping means for damping the impact, for instance in form of an outflow opening 141, so that due to the impact of the shoulder region of the vehicle occupant onto the third area 14 of the airbag the kinetic energy of the vehicle occupant can be absorbed or dissipated. Due to the impact of the shoulder region onto the airbag so much energy can in particular be absorbed or dissipated so that in case of a possible following impact of the thorax region of the vehicle occupant onto the airbag said region is only affected to a small extent.

German Priority Application 20 2008 016 777.9, filed Dec. 18, 2008 and German Priority Application 10 2009 007 179.2, filed Jan. 28, 2009, including the specification, drawings, claims and abstract, are incorporated herein by reference in their entireties.

What is claimed is:

1. An airbag arrangement for a vehicle occupant restraining system, comprising:
   at least one inflatable airbag for protection of a vehicle occupant; and
   an inflating device for inflating the airbag,
   wherein the airbag comprises:
     a first inflatable area, which extends in an inflated status of the airbag in an area of a first body region in a form of a pelvis region of the vehicle occupant,
     a second inflatable area, which extends in the inflated status of the airbag on a level of a thorax area of the vehicle occupant, the thorax area being less resilient than the first body region, and
     a third inflatable area, which extends in the inflated status of the airbag in an area of a shoulder region of the vehicle occupant,
   wherein the first inflatable area has in the inflated status of the airbag a larger thickness perpendicular to a main extension plane of the airbag than a thickness of the second inflatable area,
   wherein the inflating device and the airbag are designed for inflating the first inflatable area of the airbag to such a high internal pressure that during impact of the vehicle occupant on the airbag a force is exerted onto the first body region of the vehicle occupant which sets the vehicle occupant into a tilting motion,
   wherein the third inflatable area has a larger thickness than the thickness of the second inflatable area, the thicknesses of the first, second, and third inflatable areas being measured perpendicular to the main extension plane of the airbag, and
   wherein, in the inflated status of the airbag, the first inflatable area comprises an extension in a vehicle longitudinal direction of a vehicle larger than an extension of the second inflatable area in the vehicle longitudinal direction and the extension of the second inflatable area in the vehicle longitudinal direction is larger than an extension of the third inflatable area in the vehicle longitudinal direction, thereby generating a bevelled front side of the airbag following a contour of an upper arm of the vehicle occupant so that, when the vehicle occupant strikes the airbag during the impact, the upper arm of the vehicle occupant does not couple to the airbag or couples partially to the airbag.

2. The airbag arrangement according to claim 1, wherein the airbag arrangement is a side airbag arrangement which is arranged in the vehicle such that the thickness of the first inflatable area of the airbag runs along a vehicle cross direction, and the vehicle occupant is set during the impact of the vehicle occupant on the airbag into the tilting motion around an axis essentially continuing parallel to the vehicle longitudinal direction.

3. The airbag arrangement according to claim 1, wherein the inflating device and the airbag are designed for inflating the first inflatable area of the airbag to an internal pressure of at least approximately 1.5 bar.

4. The airbag arrangement according to claim 1, wherein the inflating device and the airbag are designed for inflating the first inflatable area of the airbag to an internal pressure between approximately 1.5 and 2.5 bar.

5. The airbag arrangement according to claim 1, wherein the first and second inflatable areas of the airbag have different internal pressures in the inflated status of the airbag.

6. The airbag arrangement according to claim 1, wherein the first and second inflatable areas are sections of a common inflatable chamber of the airbag.

7. The airbag arrangement according to claim 1, wherein the first and second inflatable areas are formed in each case by inflatable chambers being at least sectionally separated from each other.

8. The airbag arrangement according to claim 1, wherein the inflating device and the airbag are designed such that the tilting motion of the vehicle occupant causes the shoulder region of the vehicle occupant to strike the third inflatable area of the airbag before the thorax region strikes the second inflatable area of the airbag.

9. The airbag arrangement according to claim 1, wherein the second inflatable area of the airbag extends between the first and third inflatable areas.

10. The airbag arrangement according to claim 1, wherein the third inflatable area is provided with an outflow opening.

11. The airbag arrangement according to claim 1, wherein, in the inflated status of the airbag, the third inflatable area is designed such that the third inflatable area extends at least partially behind the arm of the vehicle occupant if looked at in the vehicle longitudinal direction.

12. The airbag arrangement according to claim 1, wherein the an inner surface of an airbag material defines at least one inflatable chamber of the airbag, and wherein a connection is configured to connect at least two sections of the inner surface of the airbag material such that the thickness of the second inflatable area being lower than the thickness of the first inflatable area is generated.

13. The airbag arrangement according to claim 12, wherein the connection comprises at least one dart, a retaining strip, an adhesion, or a combination thereof.

14. The airbag arrangement according to claim 1, wherein, when the airbag arrangement is assembled to a vehicle seat, the airbag in the inflated status is shorter than a backrest of the vehicle seat, if looked at in a direction along the backrest of the vehicle seat.

15. A vehicle seat with an airbag arrangement according to claim 1.

16. A method for protecting a vehicle occupant, comprising:
   arranging an airbag arrangement with at least one inflatable airbag for protecting the vehicle occupant and an inflating device, wherein the airbag comprises: a first inflatable area for protection of a first body region in a form of a pelvis region of the vehicle occupant, a second inflatable area for protection of a thorax region, the thorax region being less resilient than the first body region, and a third inflatable area for protection of a shoulder region of the vehicle occupant,
   wherein the airbag and the airbag arrangement are arranged in a vehicle such that the first inflatable area has in an inflated status of the airbag in a vehicle cross direction a larger thickness than a thickness of the second inflatable area,
   wherein the inflating device and the airbag are designed for inflating the first inflatable area in case of a collision of the vehicle to such a high internal pressure that during impact of the vehicle occupant on the airbag a force is exerted to the first body region of the vehicle occupant which sets the vehicle occupant into a tilting motion,
   wherein the third inflatable area has a larger thickness than the thickness of the second inflatable area, the thicknesses of the first, second, and third inflatable areas being measured perpendicular to a main extension plane of the airbag, and
   wherein, in the inflated status of the airbag, the first inflatable area comprises an extension in a vehicle longitudinal direction larger than an extension of the second inflatable area in the vehicle longitudinal direction and the extension of the second inflatable area in the vehicle longitudinal direction is larger than an extension of the third inflatable area in the vehicle longitudinal direction, thereby generating a bevelled front side of the airbag following a contour of an upper arm of the vehicle occupant so that, when the vehicle occupant strikes the airbag during the impact, the upper arm of the vehicle occupant does not couple to the airbag or couples partially to the airbag.

17. The method according to claim 16, wherein the first inflatable area is inflated to a pressure of at least approximately 1.5 bar.

* * * * *